US012609774B2

(12) United States Patent
Schill et al.

(10) Patent No.: US 12,609,774 B2
(45) Date of Patent: Apr. 21, 2026

(54) UNMANNED UNDERWATER VEHICLE WITH AN OPTICAL COMMUNICATION ASSEMBLY, AN OPTICAL COMMUNICATION ASSEMBLY, AND A METHOD OF TRANSMITTING AN OPTICAL SIGNAL

(71) Applicant: Hydromea SA, Renens (CH)

(72) Inventors: Felix Schill, Renens (CH); Damien Doy, Vevey (CH)

(73) Assignee: Hydromea SA, Renens (CH)

( * ) Notice: Subject to any disclaimer, the term of this patent is extended or adjusted under 35 U.S.C. 154(b) by 280 days.

(21) Appl. No.: 18/242,394

(22) Filed: Sep. 5, 2023

(65) Prior Publication Data

US 2024/0080107 A1 Mar. 7, 2024

(30) Foreign Application Priority Data

Sep. 6, 2022 (EP) ..................................... 22194133

(51) Int. Cl.
*H04B 10/80* (2013.01)
*B63G 8/00* (2006.01)

(52) U.S. Cl.
CPC ............. *H04B 10/80* (2013.01); *B63G 8/001* (2013.01); *B63G 2008/002* (2013.01)

(58) Field of Classification Search
CPC ... H04B 10/80; B63G 8/001; B63G 2008/002
See application file for complete search history.

(56) References Cited

U.S. PATENT DOCUMENTS

| | | | | |
|---|---|---|---|---|
| 10,050,864 B2 * | 8/2018 | Seo | ..................... | H04L 41/0816 |
| 2019/0280895 A1 * | 9/2019 | Mather | ............. | H04L 12/40045 |
| 2019/0385057 A1 | 12/2019 | Litichever et al. | | |
| 2021/0167855 A1 * | 6/2021 | Takahashi | ............. | G02F 1/0157 |

FOREIGN PATENT DOCUMENTS

CN        110650073 A      1/2020

OTHER PUBLICATIONS

Extended European Search Report for 22194133.9, dated Feb. 15, 2023, 11 pgs.

* cited by examiner

*Primary Examiner* — Kenneth N Vanderpuye
*Assistant Examiner* — Asif Shameem
(74) *Attorney, Agent, or Firm* — BLANK ROME LLP

(57) ABSTRACT

An optical communication assembly includes a plurality of optical communication modules, each module having at least one optical receiver which can receive optical signals, and at least one optical transmitter which selectively transmits an optical signal. Each module initiates the transmission of data in response to the module receiving a transmit command, and receives the same clock signal which clocks when the module transmits the data, so that the optical transmission of the plurality of modules is synchronised A control module selectively provides a data signal along a bus cable, so each of the optical communication modules receives the same data. The transmit command is simultaneously received by each of the optical communication modules. The clock signal is provided to the optical communication modules (3) so that the optical transmitter of each module (3) transmits the same data, in the form of an optical signal, at the same time.

16 Claims, 3 Drawing Sheets

UNMANNED UNDERWATER VEHICLE WITH AN OPTICAL COMMUNICATION ASSEMBLY, AN OPTICAL COMMUNICATION ASSEMBLY, AND A METHOD OF TRANSMITTING AN OPTICAL SIGNAL

CROSS-REFERENCE TO RELATED APPLICATION

The present application claims priority to European Patent Application No. EP22194133.9, filed on Sep. 6, 2022. The entire disclosure of which is hereby incorporated by reference.

BACKGROUND OF THE INVENTION

According to the present invention there is provided an unmanned underwater vehicle comprising an optical communication assembly which comprises a plurality of optical communication modules which occupy different positions on the unmanned underwater vehicle so that optical signals can be sent and received in different directions; and wherein the optical communication modules receive the same data for transmission and are clocked simultaneously, so that the optical transmitter of each module transmits said same data synchronously, in the form of an optical signal, at the same time in said different directions. There is further provided an optical communication assembly for use underwater, and a corresponding method of transmitting an optical signal.

DESCRIPTION OF THE RELATED ART

Often unmanned underwater vehicles are attached to a physical cable which serves as a communication channel; data can be communicated along the cable to and/or from the unmanned underwater vehicles. However physical cables restrict the mobility of the unmanned underwater vehicle; for example, a cable may hinder an unmanned underwater vehicle from moving into an underwater pipe or other 'hard-to-reach' areas. This is particularly problematic when the unmanned underwater vehicles is being used for inspection of underwater structures as certain parts of the structure will not be accessible to the unmanned underwater vehicle due to mobility restrictions imposed by the physical cable.

Other existing solutions involve providing the unmanned underwater vehicle with a wireless means of communication. However, these wireless means of communication often fail to provide reliable communication. For example, if a structure is located between the transmitter and receiver, a wirelessly transmitted signal may be blocked by that structure from being received at a receiver. In another example, a wirelessly transmitted signal may be transmitted in a direction away from the receiver so that the transmitted signal is not received at the receiver; this is particularly prevalent for unmanned underwater vehicles, since the direction in which wireless transmitters on the vehicle transmit signals is dictated by the position/orientation of the vehicle; since, during operation, the position/orientation of the vehicle is in constant change as the vehicle moves, this leads to a higher possibility that signals transmitted by the wireless transmitters on the vehicle will not be in the direction of the receiver and thus fail to be received at the receiver.

Other existing solutions, such as the communication system disclosed in US2014341584 propose using directly modulated InGaN Light-Emitting Diodes or InGaN lasers as the transmitters for an underwater data-communication device; and using automatic gain control at the receiver to facilitate performance of the apparatus over a wide-range of distances and water turbidities. However, this solution will still fail to achieve successful communication unless the direction of transmission is at least in the general direction of the receiver; this makes this solution inadequate for use in an unmanned underwater vehicle application since the position/orientation of the vehicle is in constant change as the vehicle moves during use.

It is possible to mitigate the lack of proper alignment between transmitter and receiver on moving vehicles by mechanically mounting the transmitter and receiver in such a way that it can be mechanically rotated in the opposite direction of the vehicle rotation, and thus aiming the transmitter in the direction of the receiver, and vice versa. However, such a solution adds significant mechanical complexity with moving parts which need to be water proof and pressure proof. Such a solution would also require additional means to detect the relative orientation of the transmitter and receiver, adding further complexity. Even if these challenges can be overcome, there still remains another problem that the vehicle that the system is mounted on creates an obstruction for the wireless signal, so that a single transmitter or receiver cannot obtain full omnidirectional coverage without occlusions.

Thus, existing unmanned underwater vehicles have unsatisfactory communication means. It is an aim of the present invention to obviate, or mitigate, at least some of the disadvantages or short comings associated with existing unmanned underwater vehicles.

BRIEF SUMMARY OF THE INVENTION

According to the present invention there is provided an optical communication assembly having the features recited in claim 1 which has a plurality of optical communication modules which are positioned so that each of the optical communication modules can send and receive optical signals in different directions; this enables transmission of optical signals from many positions and in many directions and also receipt of optical signals from many positions and from many directions in an underwater environment, thereby allowing for a more reliable optical communication. Moreover, in the present invention transmission of optical signals by optical communication modules in different directions is synchronized, this ensures that there will be no temporal divergence of transmitted signals sent simultaneously by the different optical communication modules, thereby allowing a receiver to receive the same transmitted signal from different optical communication modules in the same manner as if it was sent from a single source (single optical communication module). To achieve this synchronisation and coordination, the modules are connected via a bus cable which provides data communication and also the transmission of a clock reference signal. Additionally, a control module is also connected to the bus cable; the control module sends a clock reference signal to all modules which synchronises all modules to a common time reference; and further, the control module sends data to the modules to coordinate transmissions of data via the optical transmitters of the modules. The control module can further receive data from the modules that was received by respective optical receivers of the respective optical communication modules. The control module may also be configured to act as the interface between the optical communication system a host system, for example, but not limited to, an underwater vehicle, or a network port that provides a connection to other networks.

Claims 2-10 provide favourable, but non-essential, features of further embodiments of the optical communication assembly according to the present invention.

In an embodiment to the optical assembly the plurality of optical communication modules occupy different positions and/or have different orientations, so that optical signals can be sent and received in different directions.

In an embodiment to the optical assembly each of the optical communication modules further comprise a processor, and wherein the processor of each optical communication module is configured to process signals received from said control module.

In an embodiment to the optical assembly each of the optical communication modules further comprise a memory; and wherein the control module is configured to provide a data signal along the bus cable, wherein the data signal comprises data for transmission; and wherein the control module provides the same data signal to all of the optical communication modules;

and wherein the processor of each respective optical communication module stores the data for transmission in said memory of the respective optical communication module;

and wherein the processor of each respective optical communication module is further configured initiate the optical transmitter of its respective optical communication module, to transmit said data which is stored in said memory, in response to the processor receiving a transmit command from the control module;

and wherein the control module is configured to provide the same clock signal (Clk) to all of the optical communication modules so that the transmission of said data by the optical transmitters of all of the optical communication modules is synchronized.

In an embodiment to the optical assembly the bus cable (5) comprises at least, a data line (8) along which data can be sent, and a clock line (9) along which a clock signal can be sent; or wherein the bus cable (5) comprises a single line along which data can be sent and a clock signal can be sent.

In an embodiment to the optical assembly the bus cable further comprises a power line along with power can be supplied to all of the optical communication modules.

In an embodiment to the optical assembly each optical communication module can transmit data corresponding to optical data in an optical signal received at its optical receiver, to the control module, via the bus cable.

In an embodiment the optical communication assembly further comprises a bus arbiter wherein each of the plurality of optical communication modules can send a request to the bus arbiter to be master of the bus cable so that the respective optical communication module can transmit data to the control module via the bus cable.

In an embodiment to the optical assembly the processor of each module is further configured for bus arbitration, so that only one optical communication module can transmit data corresponding to optical data in an optical signal received at its optical receiver, to the control module, via the bus cable, at any one time.

In an embodiment the optical communication modules are connected in parallel to the bus cable. In another embodiment to the optical assembly optical communication assembly comprises bus arbiter; and wherein the plurality of optical communication modules are connected to the bus cable (e.g. connected to a request line of the bus cable) along which each optical communication modules can send a request to the bus arbiter to be master of the bus cable (e.g. the data line of the bus cable) so that the respect optical communication module can transmit data to the control module via the bus cable (e.g. via the data line of the bus cable). The bus arbiter may be configured to provide a bus grant signal along the bus cable to one optical communication module to be master of the bus cable at any one time.

In another embodiment the optical communication modules are connected in a daisy chain. The optical assembly optical communication assembly may comprise a bus arbiter and the plurality of optical communication modules are in a daisy chain arrangement; and wherein the plurality of optical communication modules are connected to a request line along which each optical communication modules can send a request to the bus arbiter to be master of the data line so that the respect optical communication module can transmit data to the control module via the data line of the bus cable; and wherein a bus arbiter is configured to provide a bus grant signal which propagates serially through the chain of optical communication modules.

In an embodiment to the optical assembly the control module which is connected to the bus cable is configured to selectively provide a data signal along the bus cable, wherein the data signal comprises data for transmission and a designation of which of the plurality of optical communication modules is to transmit said data;

wherein the processor of each respective optical communication module is configured to process data signal received from said control module, to determine if its module is designated to transmit said data, and the processor stores the data for transmission in said memory of the respective optical communication module only if the module is designated and wherein the processor of the optical communication modules are configured to initiate the optical transmitter to transmit said data which is stored in said memory, in response to the processor receiving a transmit command from the control module, so that only the optical transmitters of the designated optical communication modules are initiated to transmit said data;

and wherein the control module is configured to provide the same clock signal (Clk) to all of the optical communication modules so that the transmission of said data only by the optical transmitters of the designated optical communication modules, is synchronized.

In an embodiment to the optical assembly processor of each respective optical communication module is further configured to disable the transmitter of the respective optical communication module if the respective optical communication module is not designated in the data signal.

According to a further aspect of the present invention there is provided an unmanned underwater vehicle which comprises the optical communication assembly of the present invention, having the features set out in claim 11. The unmanned underwater vehicle of the present invention may have an optical communication assembly having the features of any of optical communication assembly embodiments described in the present application. In the most preferred embodiment of the unmanned underwater vehicle the optical communication modules of the optical communication assembly are mounted at different positions around the external hull of an unmanned underwater vehicle, and are oriented such that the transmitter and receiver of each optical communication module point in different directions away from the vehicle hull; this allows the optical communication assembly to provide omnidirectional coverage of transmission and reception around the vehicle, without obstruction of the line of sight by the hull or structure of the vehicle itself.

In an embodiment the unmanned underwater vehicle comprises one or more optical communication modules located on one side of the vehicle and one or more optical communication module located on an opposite side of the vehicle, so that the optical communication assembly can send and/or receive optical signals at either side of the vehicle.

In an embodiment the unmanned underwater vehicle comprises optical communication modules located at different positions around the vehicle so that the optical communication assembly can send and/or receive optical signals over a 360° angle.

The unmanned underwater vehicle of the present invention may comprise an optical communication assembly according to any one of the optical communication assembly embodiment described herein. The unmanned underwater vehicle of the present invention may comprise an optical communication assembly having any one or more of the features described in the present application.

According to a further aspect of the present invention there is provided a cable comprising an optical communication assembly according to any of the optical communication assembly embodiment described herein, wherein said plurality of optical communication modules are distributed along a length of the cable.

In an embodiment a width of each of the respective optical communication modules is equal to, or less than, a cross-sectional diameter of the cable.

According to a further aspect of the present invention there is provided an unmanned underwater vehicle comprising a cable according to the present invention. Preferably the cable is removably attached to the unmanned underwater vehicle so that the cable can be selectively detached from the unmanned underwater vehicle when the vehicle has reached a predefined location underwater; and wherein the unmanned underwater vehicle comprises one or more optical transmitters and photoreceivers which can send and receive optical signals to/from the optical communication modules on the cable.

In an embodiment the cable is removably attached to the unmanned underwater vehicle by a remotely controlled attachment means, wherein the attachment means can be remotely controlled to be in a first configuration wherein the attachment means attaches the cable to the unmanned underwater vehicle, or in a second configuration wherein the cable is unattached from the unmanned underwater vehicle.

According to a further aspect of the present invention there is provided a method of transmitting an optical signal using an optical communication assembly according to any one of the optical communication assembly embodiment described herein, the method comprising the steps of, providing a data signal, which comprises data to be transmitted, along the data line, so that each of the optical communication modules receive the same data to be transmitted; providing a clock signal, along said bus cable, which is simultaneously received by each of said optical communication modules, so that the optical transmitter of each module transmits said same data, in the form of an optical signal, at the same time in said different directions.

In an embodiment the method may comprise the steps of, providing the same data signal along the bus cable, to all of the optical communication modules, wherein the data signal comprises data to be transmitted; storing the data provided in the data signal in a respective memory of each optical communication module;

receiving at a processor of each respective optical communication module a transmit command which has been sent along the bus cable by the control module, wherein said transmit command is received by all of the processors at the same time; in response to receiving the transmit command initiating the optical transmitter of the optical communication module to transmit said data which is stored in the memory of that optical communication module; providing a same clock signal (Clk) which clocks when optical transmitter of each module transmits said data, to the processors of all of the optical communication modules, so that the transmission of said data by the optical transmitters of all of the optical communication modules is synchronized.

In an embodiment of the method, the step of providing a data signal comprises providing a data signal which comprises data for transmission and an indication of which of the plurality of optical communication modules is to transmit said data; and wherein the method further comprises the step of, processing at a processor of each optical communication module the data signal, to determine if its module should transmit said data and disabling the transmitter if its module is not indicated in the data signal; and wherein the step of providing a clock signal, comprises providing a clock signal along said bus cable that the optical transmitter of each module indicated in said data signal transmits said same data, in the form of an optical signal, at the same time in said different directions.

According to a further aspect of the present invention there is provided a method of receiving an optical signal using an optical communication assembly according to any of the above-mentioned optical communication assembly embodiments, the method comprising the step of receiving at respective optical receiver(s) of one or more optical communication modules an optical signal.

At each optical communication module which received an optical signal, carrying out the steps of: outputting an analog signal corresponding to the received amplitude of the optical signal to an analog-digital-converter (ADC); converting the analog signal to digital signal. Most preferably the method further comprises, at each optical communication module which received an optical signal, carrying out one or more of the following steps locally in the optical communication module: digital signal decoding, and/or error checking and/or message detection. This local processing minimises the length of analogue signal connections.

In an embodiment, at each optical communication module which received an optical signal, requesting bus access from a bus arbiter. In the preferred embodiment the processor the optical communication module will request bus access. When only one single optical communication module received the optical signal, then granting bus access to that one optical communication module; and then sending data corresponding to the data in the received optical signal from that one single optical communication module to the control module.

If multiple optical communication modules received the same optical signal simultaneously, the processor of these modules will each request bus access; selecting, using the bus arbiter, one of the multiple optical communication modules and granting bus access to said selected module; and then sending data corresponding to the data in the optical signal received at said selected module, from said selected optical communication module to the control module. At each of the multiple optical communication modules which were not selected to be granted bus access, discarding the data that was in the received optical signal.

In one possible implementation of the bus arbitration, each optical communication module has a unique identifier; most preferably the unique identifier is an integer number that enumerates all modules on the bus cable uniquely. The method may comprise repeatedly polling all optical communication modules sequentially, and each optical communication module returns to the bus arbiter a status response containing its unique identifier and an indication of whether or not the optical receiver of that module has received an optical signal. If the status request received at the arbiter indicate that the optical receivers of one or more optical communication modules have received an optical signal, then selecting, using the bus arbiter one optical communication module and granting bus access to that selected optical communication module. In one embodiment the bus arbiter will select an optical communication module to grant bus assess based on a pre-defined ordering scheme of the unique identifier (for example, the module with the numerically smallest identifier).

BRIEF DESCRIPTION OF THE DRAWINGS

Exemplary embodiments of the invention are disclosed in the description and illustrated by the drawings in which:

FIG. 1b illustrates the optical communication assembly according to another aspect of the present invention, which is provided in the unmanned underwater vehicle of FIG. 1a;

DETAILED DESCRIPTION OF THE INVENTION

Figure 1A:
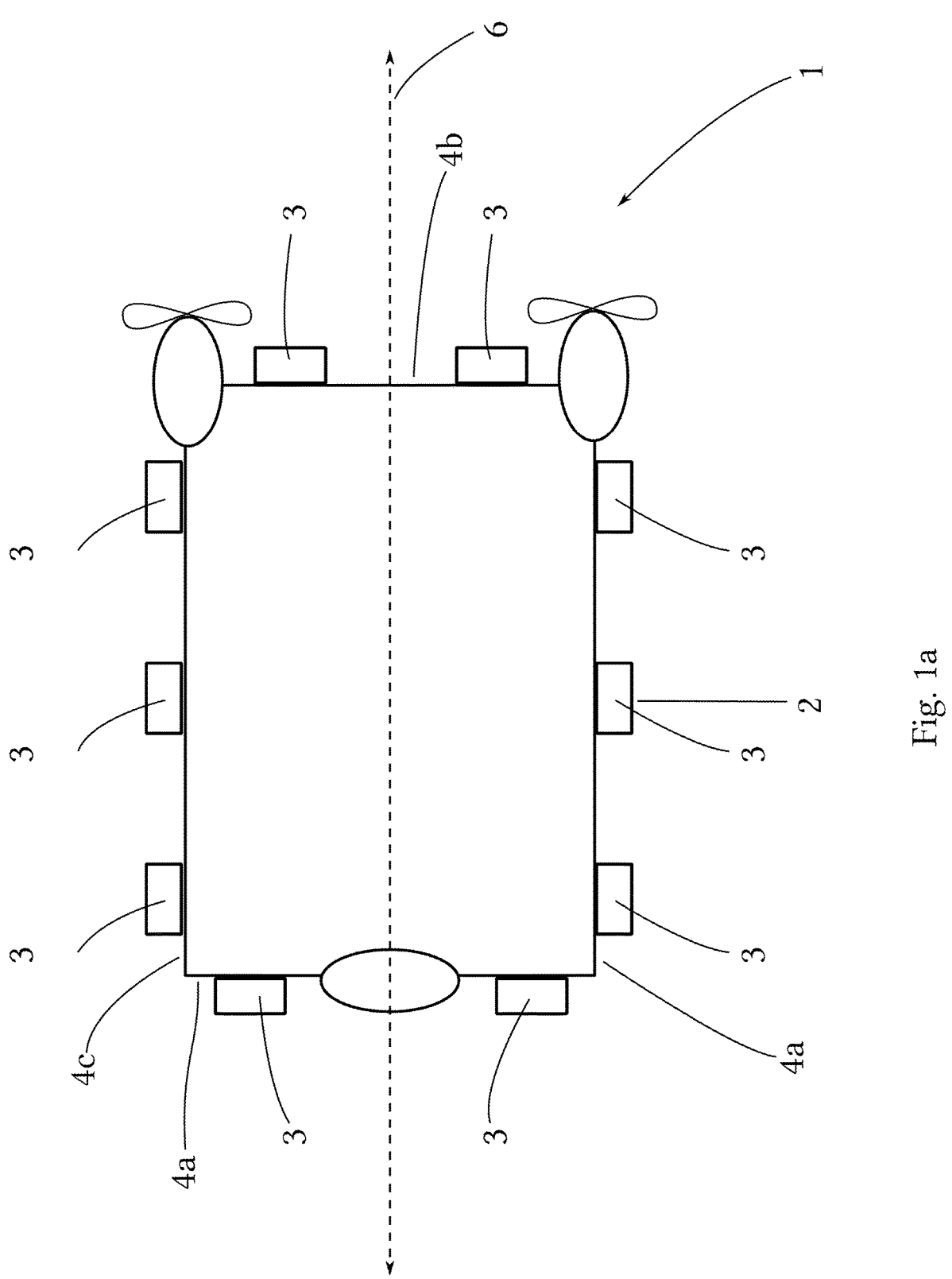
FIG. 1a provides a top view of an unmanned underwater vehicle according to an embodiment of the present invention.
Figure 1B:
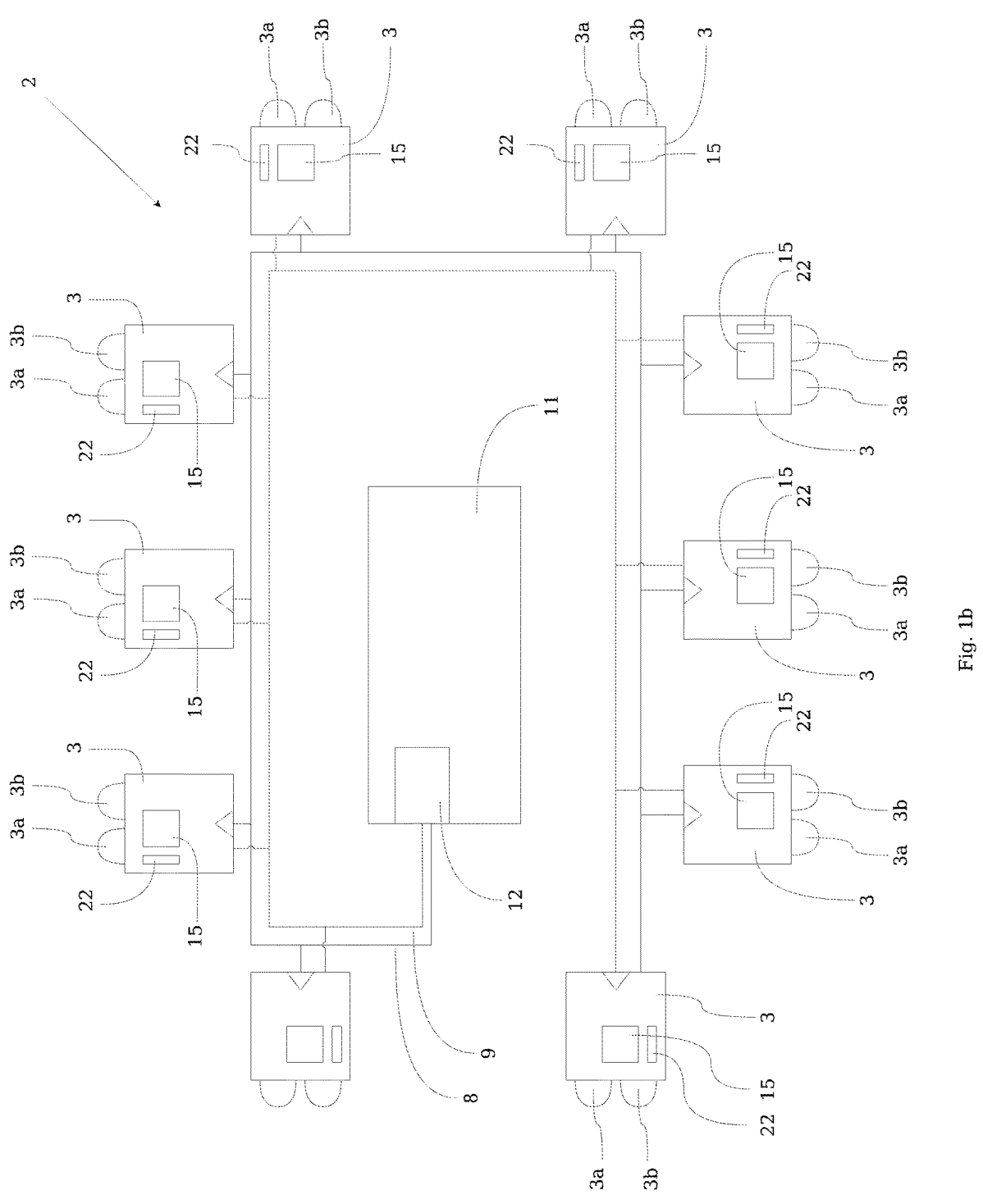

According to the present invention there is provided an optical communication assembly suitable for use underwater. FIG. 1b illustrates an optical communication assembly according to an embodiment of the present invention. FIG. 1a provides a top view of an unmanned underwater vehicle 1 according to a further aspect of the present invention; the unmanned underwater vehicle 1 has an optical communication assembly of FIG. 1b. It should be understood that the optical communication assembly 2 is not limited to use on an unmanned underwater vehicle 1; the optical communication assembly 2 can be used for any suitable application. For example, according to further aspect of the present invention there is provided a cable which comprises the optical communication assembly 2. In another example the optical communication assembly 2 is mounted on an underwater structure (such as on an underwater tunnel or pipe).

Figure 2:
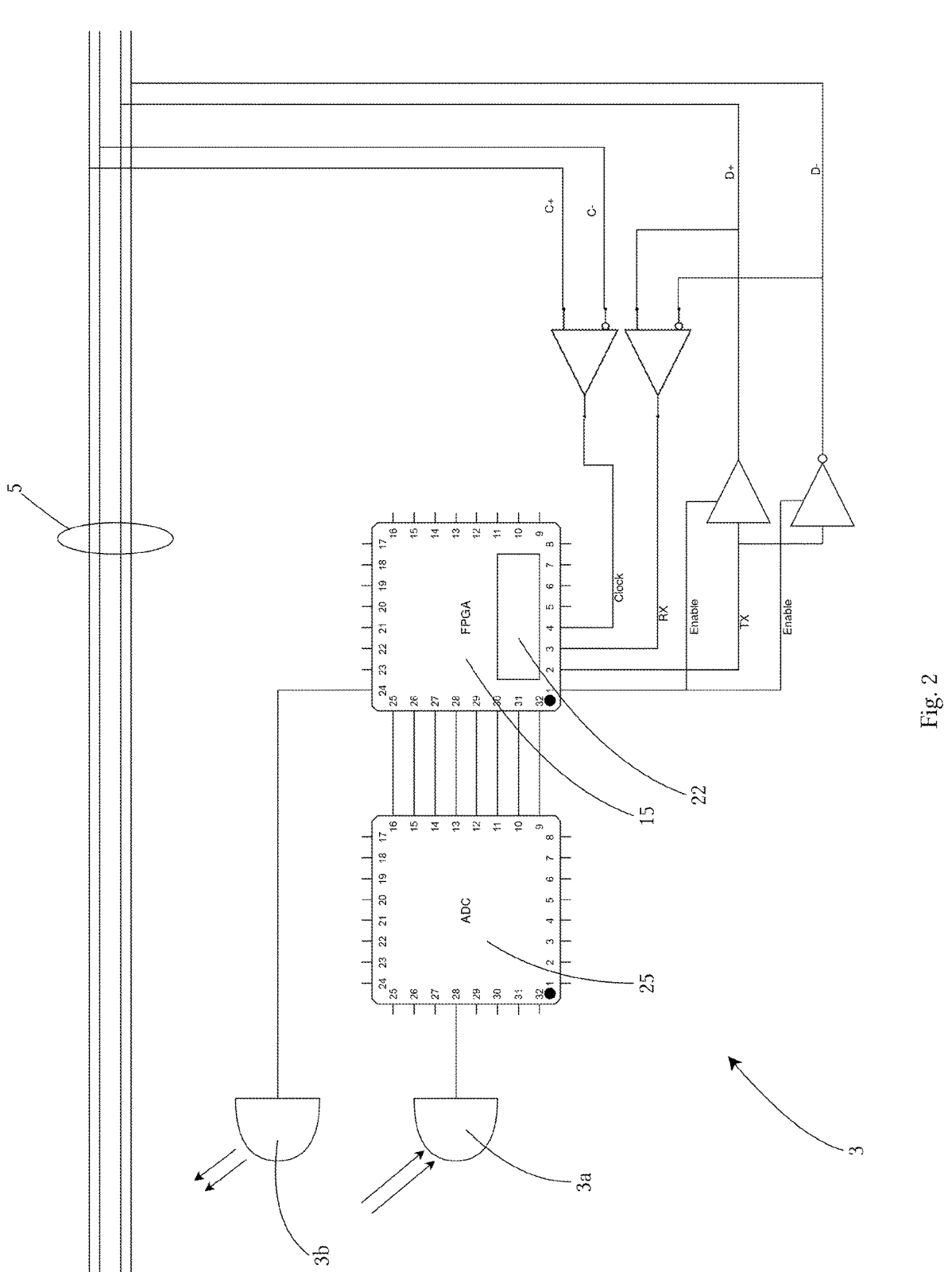
FIG. 2 is a circuit diagram of an optical communication module of the optical communication assembly shown in FIG. 1b; each optical communication module in the optical communication assembly has the electrical implementation shown in FIG. 2.

Referring to FIGS. 1a and 1b, the optical communication assembly 2 comprises a plurality of optical communication modules 3, each module comprising at least one optical receiver 3a and at least one optical transmitter 3b. It should be understood that the at least one optical receiver 3a is not an essential feature of the optical communication assembly 2 of the present invention. FIG. 2 is a circuit diagram of one optical communication module 3; it should be understood that in the preferred embodiment of the optical communication assembly 2, each of the optical communication module 3 have the circuit implementation shown in FIG. 2.

The optical transmitter 3b of each module 3 is configured to initiate transmission of data in response to the module 3 receiving a transmit command, and each module 3 is configured to receive the same clock signal (Clk) which clocks when the module 3 transmits said data, so that the optical transmission of the plurality of modules 3 is synchronised. Most preferably the data transmitted by a module 3 comprises feedback signals for navigation and/or video signal, preferably a high-definition video signal or better. FIG. 2 is a circuit diagram of an optical communication module 3 of the optical communication assembly 2 shown in FIG. 1b and like features are awarded the same reference numbers; each optical communication module 3 in the optical communication assembly 2 has the electrical implementation shown in FIG. 2.

As illustrated in FIG. 1a the plurality of optical communication modules 3 are positioned on the unmanned underwater vehicle 1 so that each of the optical communication modules 3 can send and receive optical signals in different directions. Specifically, in this embodiment the unmanned underwater vehicle 1 comprises three optical communication modules 3 located at each respective side 4a, 4b, 4c, 4d of the vehicle 1 so that the optical communication modules 3 are located at different positions around the vehicle 1; this allows the optical communication assembly 2 to send and/or receive optical signals over a 360° angle. In this embodiment the optical communication assembly 2 comprises a total of '12' optical communication modules 3 however it should be understood that the optical communication assembly 2 may comprise any number of optical communication modules 3 greater than or equal to two.

It should be understood that it is not essential that the plurality of optical communication modules 3 are located at different positions around the vehicle 1 to allow the optical communication assembly 2 to send and/or receive optical signals over a 360° angle; the advantages of the present invention can be realized so long as the optical communication modules 3 are provided on at least two sides of the vehicle. For example, in another embodiment one or more optical communication module(s) 3 are located on one side of the vehicle 1 and one or more optical communication module(s) 3 located on an opposite side of the vehicle 1, so that the optical communication assembly 2 can send and/or receive optical signals at either side of the vehicle 1.

It should be understood that the unmanned underwater vehicle 1 is not limited to having the form, shape, or design, illustrated in FIG. 1a; the unmanned underwater vehicle 1 may take any suitable shape, form or design (the vehicle is not limited to having the rectangular shape shown in FIG. 1a). Irrespective of the shape, form or design of the unmanned underwater vehicle 1, in the present invention there will preferably be at least one or more optical communication module(s) 3 located on one side of an axis of symmetry 6 of the vehicle and one or more optical communication module(s) 3 located on an opposite side of the axis of symmetry 6 of the vehicle.

Referring now to FIGS. 1b and 2 which show respectively the optical communication assembly 2 and optical communication modules 3 respectively in more detail. The optical communication assembly 2 comprises a bus cable 5, which is connected to all of said optical communication modules 3. In the most preferred embodiment the optical communication assembly 2 comprises a single bus cable 5 only. In this embodiment the bus cable 5 comprises at least, a data line 8 along which data can be sent, and a clock line 9 along which a clock signal (Clk) can be sent. In a preferred embodiment the data line 8 comprises one differential twisted pair of wires to transmit data in both directions in half-duplex mode. In a preferred embodiment the a clock line 9 comprises one differential pair of wires to transmit a clock signal (Clk) from a control module 11 to the respective optical communication modules 3. In another embodiment, the bus cable 5 comprises one differential pair of wires which define both the data line 8 and the clock line 9; in this other embodiment the clock signal (Clk) is encoded into the data transmissions, and decoded at the respective optical communication modules 3, in order to synchronise them to the control module 11. It should be understood that it is not essential to for the bus cable to have a data line (8) along which data can be sent and a clock line (9) along which a clock signal can be sent; in another embodiment for example the bus cable (5) comprises a single line along which data can be sent and a clock signal can be sent; in this other embodiment the data (data signal) and clock signal can be sent along the same single line; in the case the data (data signal) and clock signal are mixed on the same single line, the clock signal can be recovered using a clock recovery method known in the art.

In the embodiment shown in FIG. 1*b* the bus cable 5 further comprises a power line 10 along with power can be supplied to all of the optical communication modules 3. In a preferred embodiment the power line 10 comprises two wires to transmit power.

The optical communication assembly 2 further comprises a control module 11 which is connected to the bus cable 5, and which is configured to selectively provide a data signal, which comprises data to be transmitted, along the data line 8 of the bus cable 5, so that each of the optical communication modules 3 can receive the same data to be transmitted. The data signal may comprise feedback signals for navigation and/or video signal, preferably a high-definition video signal or better.

Each of the optical communication modules 3 further comprise a memory; data which is sent by the control module 11 in a data signal to each optical communication module 3 can be stored in the memory of each respective optical communication module 3.

The control module 11 is configured to provide a clock signal (Clk), along said clock line 9 of the bus cable 5, which is simultaneously received by each of said optical communication modules 3; the clock signal (Clk) clocks when the module (3) transmits data, so that the optical transmission of the plurality of modules (3) is synchronised. Accordingly the optical transmitter 3*b* of each module 3 transmits said same data, in the form of an optical signal, at precisely the same time; furthermore, since the optical communication modules 3 are located at different positions around the vehicle 1 the same data will be transmitted, in the form of an optical signal, at the same time, in different directions (in other words the same optical signal will be transmitted by the optical communication modules 3 in different directions). Most preferably the data transmitted by the modules 3 comprises feedback signals for navigation and/or video signal, preferably a high-definition video signal or better. Typically, the data is to be transmitted to a receiver which is located remote to the vehicle 1; in this specific embodiment since the plurality of optical communication modules 3 are located at different positions around the vehicle 1 the data is transmitted over a 360° angle, so the transmission of at least one of the optical communication modules 3 will be in the direction of the remotely located receiver thereby increasing the reliability of communication between the optical communication assembly 2 and the remotely located receiver. Furthermore since the transmission of all the optical communication modules 3 is synchronised to the same clock signal (Clk) this ensures that there will be no temporal divergence of transmitted signals sent simultaneously by the different optical communication modules 3, thereby allowing the remotely located receiver to receive the same transmitted signal from different optical communication modules 3 in the same manner as if it was sent from a single source (single optical communication module).

Preferably the optical signal which is transmitted by each of the optical communication modules 3, will comprise light pulses, each light pulse representing a data bit; the light pulses transmitted by each of the optical communication module 3 will be aligned with one another, within a temporal tolerance substantially smaller than the duration of the light pulse, meaning that the rising edges and falling edges of the light pulses in the optical signals sent by each optical communication module 3 will be aligned with the rising edges and falling edges of the light pulses in the optical signals sent by each of the other optical communication modules 3 in the optical communication assembly 2. Accordingly, due to the simultaneous transmission of the same optical signal by the optical communication modules 3 and the light pulses which define said transmitted optical signal being aligned with one another, to a remotely located receiver which receives the light pulses from a plurality of different optical communication modules 3, the received light pulses will be indistinguishable from light pulses coming from a single source. In other words, the present invention ensures that the remotely located receiver may receive an optical signal from multiple optical communication modules 3 but still observe a well-defined sum of pulses without temporal divergence (the light pulses received at the remote receiver will not be overlapping or time-shifted), allowing the remote receiver to decode the modulated signal in the same way as if it was sent from a single transmitter. By synchronising the transmission of all of optical communication modules 3 to emit their optical pulses in synchrony, a key advantage is that omni-directional transmission without occlusion is possible by having the optical communication modules 3 located at different positions on the unmanned underwater vehicle. A further advantage is that the strength of the transmitted optical signal (which is received at the remote receiver) can be scaled up by simply by increasing the number of optical communication modules 3.

In this embodiment each module 3 comprises a processor 15 (e.g. a digital signal processor 15; each processor 15 may comprise an FPGA for example, or a microcontroller, or both). The processor 15 of each optical communication module 3 is configured to process signals/commands received from said control module 11 along the bus cable 5. Each module 3 further comprises a memory 22.

Each processor 15 is configured to receive and decode optical signals which have been received at the optical receiver 3*a* of its respective optical communication module 3.

Each processor 15 is further configured to (e.g. programmed to) receive a data signal from the control module 11, which has been sent along the bus cable 5 (preferably sent along the data line 8), wherein the data signal comprises data which is to be transmitted by the optical transmitter 3*b* of the module 3; the same data signal is sent to the respective processors 15 of all the module 3. Each processor 15 is configured to process said data signal e.g. to extract the data which is to be transmitted; and to save the data which is to be transmitted in the memory 22 of that respective module 3.

Each processor 15 is further configured to receive a transmit command from the control module 11 and to initiate the optical transmitter 3*b* of its respective optical communication module 3 to transmit the data which is stored in the memory 22 of that respective module 3, in the form of an optical signal. In the preferred embodiment the transmit command will be sent by the control module 11 to the processors 15 of all of the modules 3 simultaneously; this will ensure that all of the modules 3 will be initiated at the same time to transmit said data. Upon receiving this transmit command from the control module 11, each module 3 simultaneously starts transmitting the data which is stored in its memory 22, by sequentially reading each bit of the data from memory, optionally applying a signal encoding algorithm, and outputting the resulting signal to the optical transmitter 3*b*, where it is converted to a pulsed light output.

The transmission of the data by the optical transmitters 3*b* of the respective module 3 is then synchronised by the same clock signal (Clk) which is sent to the processors of all of the modules 3. Each processor 15 is configured to receive the clock signal (Clk) from the control module 11, which has been sent along the bus cable 5 (preferably sent along the clock line 9), and to operate the optical transmitter 3*b* of its respective optical communication module 3 to transmit according to the clock signal (Clk) (i.e. the clock signal clocks when the transmitter 3*b* should transmit said data. In the preferred embodiment clock signal clocks when the processor sends an optical signal to the transmitter 3*b* which causes the transmitter 3*b* to transmit said data). Since the processors 15 of all the modules receive the same data signal and receive the same clock signal (Clk) at the same time, the optical transmission of the plurality of modules (3) is synchronised. In the preferred embodiment the operation of the processors 15 is synchronised to the clock signal (Clk); in other words all of the processors 15 carry out the above mentioned steps in simultaneously, synchronised by the clock signal (Clk). In other words, in this embodiment since each module 3 is synchronised to the same clock signal (Clk) which is sent along the bus cable (5) (preferably via the clock line 9), and as each module 3 receives the transmit command at the same time, and carries out the same function, the resulting sequence of light pulses which define the transmitted optical signal, will be exactly synchronised across all transmitting modules 3.

The processor 15 of each module 3 is further configured to store data, which is in an optical signal which has been received at the optical receiver 3*a* of the module 3, in the memory 22 of that module 3. The data may be stored temporarily in the memory 22. In an embodiment each processor 15 is configured to (e.g. programmed to) verify the integrity of a received optical signal, for example by computing a checksum or cyclic redundancy check and comparing it to a reference value that is encoded within the received optical signal; this advantageously allows each optical communication module 3 to discard corrupted optical signals, avoiding unnecessary bus transmissions and reducing bus bandwidth requirements.

Each optical communication module 3 can transmit data corresponding to data contained in an optical signal received at its optical receiver 3*a*, to the control module 11, via the bus cable (preferably via the data line 8 of the bus cable 5). In the case that the processor 15 has stored the data, which was in an optical signal which was received at the optical receiver 3*a* of the module 3, in the memory 22 of that module 3, the processor 15 can retrieve the stored data from the memory 22 and sent said retrieve data via the bus cable 5 (preferably via the data line 8 of the bus cable 5) to the control module 11. For example, an optical signal received at an optical receiver 3*a* may comprise data in the form of command signals for controlling the navigation of the unmanned underwater vehicle 1, the optical communication module 3 can transmit the command signals via the data line 8 to the control module 11; the control module 11 will send the commands to the vehicle control system which executes the commands thereby effecting navigation control of the vehicle.

As shown in FIG. 1*b*, the optical communication assembly comprises bus arbiter 12 within the control module 11 and the plurality of optical communication modules 3 are in a multi-drop bus arrangement. During operation the control module 11 acts as the bus master. When transmitting data, the control module 11 asserts write access to the bus cable 5, and the optical communication modules 3 read data from the bus cable 5. When an optical communication module 3 is receiving an optical signal at its optical receiver 3*a*, the processor 15 of that module 3 will request bus access from the bus arbiter 12 within the control module 11. When bus access is granted to the optical communication module 3, the processor 15 of that module 3 will send the optically received data via the bus cable 5 to the control module 11, and the control module 11 will receive said data. If multiple optical communication modules 3 receive the same optical signal simultaneously, the processor 15 of these modules 3 will each request bus access, but the bus arbiter 12 will select and grant bus access to only one optical communication module 3. The processor 15 belonging to the one selected module 3 will send the optically received data via the bus cable 5 to the control module 11, and the control module 11 will receive said data; and preferably all the other optical communication modules 3 (which were not selected) will discard the received message. This reduces the required bus bandwidth by eliminating redundant data transfers of identical received signals.

In one possible implementation of the bus arbitration, each optical communication module 3 has a unique identifier; most preferably the unique identifier is an integer number that enumerates all modules 3 on the bus cable 5 uniquely. The bus arbiter 12 repeatedly polls all optical communication modules 3 sequentially, and each optical communication module 3 returns to the bus arbiter 12 a status response containing its unique identifier and an indication of whether or not the optical receiver 3*a* of that module 3 has received an optical signal. If the status request received at the arbiter indicate that the optical receivers 3*a* of one or more optical communication modules 3 have received an optical signal, the bus arbiter 12 then selects one optical communication module 3 and grant bus access to that selected optical communication module 3. In one embodiment if more than one optical communication modules 3 have received an optical signal the bus arbiter will select an optical communication module 3 to grant bus assess based on a pre-defined ordering scheme of the unique identifier (for example, the module with the numerically smallest identifier). The bus arbiter 12 then sends a message to the processor 15 of the selected optical communication module 3 and a command granting bus access to that module.

In another embodiment of the present invention only some of the available optical communication modules 3 are used to transmit a signal to a remotely located receiver. In this other embodiment the control module 11 is configured to selectively provide a data signal along the bus cable 5

(preferably along the data line 8 of the bus cable 5), wherein the data signal comprises data for transmission and a designation of which of the plurality of optical communication modules 3 is to transmit said data. Most preferably each optical communication module 3 has a unique identifier assigned to it; the control module 11 can designate a respective optical communication module 3 in a data signal by providing in the data signal the unique identifier assigned to that optical communication module 3. The processor 15 of each respective optical communication module 3 is further configured to process said data signal received from said control module 11 to determine if its respective module 3 is one of the optical communication modules 3 designated to transmit said data, and the processor stores the data for transmission in said memory 22 of the respective optical 15 communication module only if the module is designated. Accordingly, when the control module 11 sends a transmit command to all of the modules 3 only the processors 15 of the designated optical communication modules 3 will initiate the optical transmitters 3b to transmit said data which is stored in said memory, in response to the processor receiving a transmit command from the control module, so that only the optical transmitters of the designated optical communication modules are initiated to transmit said data; and the control module is configured to provide the same clock signal (Clk) to all of the optical communication modules so that the transmission of said data only by the optical transmitters of the designated optical communication modules, is synchronized. In one embodiment the processor 15 of each respective optical communication module 3 is further configured to temporarily disable the transmitter 3b of its respective optical communication module 3 if the optical communication modules 3 is not designated in the data signal to transmit said data; the temporarily disablement of the transmitter 3b will ensure that the respective optical communication module 3 will not initiate transmission of data when the control module 11 sends a transmit command to all of the modules 3.

In an embodiment if the same optical signal containing data is received by respective optical receivers 3a of a plurality of optical communication modules 3, it is sufficient that the data corresponding to data contained in the received optical signal is sent only once over the bus cable 5 (preferably over the data line 8) to the control module 11 to avoid excessive traffic and associated congestion on the data line 8. In an embodiment the control module 11 is configured to send a status request to each optical communication module 3 in sequence, asking if an optical signal has been received by the optical receiver 3a of that optical communication module 3 and for details of what the packet sequence number and cyclic redundance check of the received optical signal is. Most preferably the processor 15 of each respective optical communication module 3 is configured to receive and process said status request which the control module 11 sends. The processor 15 of each optical communication module 3 therefore responds to the status request by sending the control module 11 a status message which contains an indication of whether or not an optical signal has been received by the optical receiver 3a of that optical communication module 3 and, if an optical signal has been received, details of what the packet sequence number is and if the cyclic redundancy check of the received optical signal was successful, i.e. indicating the reception of an uncorrupted message. The control module 11 is configured to determine, from the status messages received from the respective digital signal processors 15 if more than one photoreceivers 3a of different optical communication modules 3 have received the same optical signal, by comparing the packet sequence numbers of the messages with a successful cyclic redundancy check. If the packet sequence numbers are equal, the modules 3 have received the same optical signal; if they are different, the modules 3 have received different optical signals.

If the control module 11 determines that more than one optical receiver 3a of different optical communication modules 3 have received the same optical signal, the control module 11 will request only one of said optical communication modules 3 to send data corresponding to data contained in the received optical signal to the control module 11. For example the control module 11 may instruct bus arbiter 12 to provide a bus grant signal to a selected one of said optical communication modules 3 which received the optical signal, so that only that selected optical communication modules 3 sends data corresponding to data contained in the received optical signal to the control module 11; the other optical communication modules 3 which had received the optical signal will not receive a bus grant signal; accordingly the data corresponding to data contained in the received optical signal is sent only once over the data line 8 to the control module 11 to avoid excessive traffic and associated congestion on the data line 8. It should be remembered that in the preferred embodiment when an optical receiver 3a has received an optical signal, the processor 15 of that module 3 will store data which corresponds to data contained in the received optical signal, in the memory 22 of the module 3; accordingly, before the processor 15 will retrieve said data from the memory 22 before it is sent over the data line 8 to the control module 11. Most preferably each optical communication module 3 has a unique identifier assigned to it; when the control module 11 is instructing bus arbiter 12 to provide a bus grant signal to a selected one of said optical communication modules 3, the instruction which the control module 11 sends to the bus arbiter 12 will contain the unique identifier assigned to that selected optical communication module 3, so that the bus arbiter 12 knows to which optical communication module 3 to send the bus grant signal to.

If the control module 11 determines that more than one optical receiver 3a of different optical communication modules 3 have received different optical signals, the control module will request each one of said optical communication modules 3 that received different optical signals to send data corresponding to data contained in the respective received optical signals to the control module 11 one by one. For example, if optical receiver 3a of two different optical communication modules 3 have received respective two different optical signals, then the control module 11 will first request one of said two optical communication modules 3 to send data corresponding to data contained in optical signal it received, to the control module 11; and subsequently the control module 11 then request the other of said two optical communication modules 3 to send data corresponding to data contained in optical signal it received, to the control module 11. In one embodiment control module 11 may be configured to directly request one of said two optical communication modules 3 to send data corresponding to data contained in optical signal it received, to the control module 11; and subsequently directly request the other of said two optical communication modules 3 to send data corresponding to data contained in optical signal it received, to the control module 11. Most preferably each optical communication module 3 has a unique identifier assigned to it and the control module 11 can use these unique identifiers to send or receive data/request to/from a specific optical communication module 3. For example, when directly sending a request to an optical communication module 3 to send data corresponding to data contained in an optical signal it received to the control module 11, the control module 11 will tag the request with the unique identifier assigned to the optical communication module 3 for which the request is intended so that only the processor 15 of the optical communication module 3 with the unique identifier corresponding to the unique identifier specified in the tag of the request, will process the request. In this way the control module 11 can select specific optical communication module 3 to send data corresponding to data contained in an optical signal, to the control module 11. In one embodiment the control module 11 will select one of the two optical communication module 3 to send data corresponding to data contained in an optical signal it received to the control module 11 based on a pre-defined ordering schemes of the unique identifier (for example, the module with the numerically smallest identifier).

In another example, the control module 11 may instruct bus arbiter 12 to provide a bus grant signals consecutively to said respective two optical communication modules 3 so that the control module 11 receives the data from the respective optical communication modules 3 one at a time. Most preferably each optical communication module 3 has a unique identifier assigned to it; when the control module 11 is instructing bus arbiter 12 to provide a bus grant signal to one of said two optical communication modules 3, the instruction which the control module 11 sends to the bus arbiter 12 will contain the unique identifier assigned to that optical communication module 3, so that the bus arbiter 12 knows to which optical communication module 3 to first send the bus grant signal to; when the control module 11 is instructing bus arbiter 12 to provide a bus grant signal to the other of said two optical communication modules 3, the instruction which the control module 11 sends to the bus arbiter 12 will contain the unique identifier assigned to that other optical communication module 3, so that the bus arbiter 12 knows to which optical communication module 3 to sent the bus grant signal to.

In another implementation of the bus arbitration, each module has the ability to listen to the bus cable 5 while transmitting along the bus cable 5 (e.g. while transmitting a signal/data to the control module 11); and the bus cable 5 is preferably configured such that there are two binary symbols that can be transmitted (for example a logical 0 and a logical 1), and such that one symbol is dominant, and the other symbol is recessive. If multiple optical communication module 3 transmit along the bus cable 5 at the same time (e.g. if multiple optical communication modules 3 are transmitting a signal/data to the control module 11 along the bus cable 5 at the same time), and one module 3 transmits a dominant symbol while the other module 3 transmits a recessive symbol, the bus cable 5 will carry the state of the dominant symbol. If an optical communication module 3 detects that the bus state differs from its own transmission, i.e. if the optical communication module 3 currently transmits a recessive symbol but detects that the bus cable 5 is in the dominant state, it will abort its transmission. Further, preferably, each optical communication module 3 starts its transmission with a start sequence that contains its unique bus identifier; hence, if multiple optical communication modules 3 start their transmission along the bus cable 5 at the same time, all except one optical communication module 3 will abort their transmission, and only the optical communication module 3 with the identifier that has the highest-ranked dominant bits will complete its transmission along the bus cable 5. In the embodiment, if the respective optical receivers 3a of multiple optical communication modules 3 receive an optical signal at the same time, each of these modules 3 will start transmitting their received message on the bus cable 5 to the control module 11; all except one of the modules 3 will abort their transmission, resulting in a single transmission of the received message to the control module 11. The modules 3 which aborted their transmissions continue to listen to the bus cable 5, and determine if the signal/data that is currently being transmitted by the module 3 along the bus cable 5 to the control module 11 matches the optical signal (or matches the data which is in the optical signal) which was received at the optical receiver 3a of their respective module 3, by comparing the package sequence numbers. If the signals/data match, the modules 3 that aborted during the bus arbitration will discard the optical signals which were received by their respective optical receivers 3a (so these modules 3 will not try to send the signal/data contained in the received optical signals to the control module 11). If the packet sequence numbers are different, the modules 3 with differing numbers will attempt another bus transmission directly after the initial transmission completed. If there are still more than one module transmitting on the bus, the process repeats as before, selecting only one highest-ranked module to complete the transmission. This process repeats until all modules have either transmitted or discarded their received message.

In a preferred embodiment the optical receiver 3a of each optical communication module 3 is connected to an Analog-to-Digital converter (ADC) 25; the ADC 25 is in turn connected to the processor 15 of the module 3. In this preferred embodiment, in each respective optical communication module 3, in response to the optical receiver 3a receiving an optical signal the optical receiver 3a will output an analog signal (corresponding to the received amplitude of the optical signal) to the ADC; the ADC will convert the analog signal to digital signal. Digital signal decoding, error checking and message detection can therefore be carried out on said digital signal, locally, in each respective optical communication module 3 (for example in one embodiment the processor 15 of each optical communication module 3 is further configured to carry out signal decoding, error checking and message detection, of the digital signal). This local processing minimises the length of analog signal connections. Compared to other solutions that may use multiple physically separated photoreceivers that are all directly connected to a central processing unit, potentially using long analogue interconnects, the embodiment described here avoids issues with noise and cable losses, and greatly simplifies the wiring as it is then possible to use digital signalling over a single twisted pair cable, potentially over many tens of meters.

FIG. 1b provides a schematic view of an exemplary optical communication assembly 2 according to an embodiment of the present invention. The optical communication assembly 2 may have any of the feature and variations already described above with respect to the FIGS. 1a and 1b.

According to a further aspect of the present invention there is provided a cable which comprises the optical communication assembly 2. In an embodiment the optical communication modules 3 of the communication assembly 2 are distributed along the length of a cable to allow for better omnidirectional optical communication coverage over a larger area. In another example the optical communication modules 3 may be distributed along a grid of cables.

For example the optical communication modules 3 of the communication assembly 2 could be distributed along a cable with 50 m-100 m length, with an optical communication module 3 positioned along the cable every 10-20 meters. Each optical communication module 3 may be configured to have a width substantially corresponding to a diameter of a cross-section of the cable; this reduces the possibility for the optical communication modules 3 causing any obstruction during use of the cable; for example the cable can still be easily wound up on a cable drum or spool, and pulled out around corners without the optical communication modules 3 obstructing.

In further aspect of the present invention there is provided an unmanned underwater vehicle having removably attached thereto a cable which comprises the optical communication assembly 2, wherein the plurality of optical communication modules 3 belonging to the communication assembly 2 distributed along a length of the cable. In this embodiment the unmanned underwater vehicle can pull the cable with the optical communication modules 3 behind itself into a complex structure (e.g. a ballast water tank, underwater cavern, submerged foundation, underwater tunnel, etc.). Once the cable is in place, the unmanned underwater vehicle detaches the cable, and can now move freely. The unmanned underwater vehicle may comprise one or more optical transmitters and one or more photoreceivers; the optical transmitter(s) and photoreceiver(s) on the unmanned underwater vehicle can send and receive optical signals to/from the optical communication modules 3 on the cable. The modules 3 on the cable thus provide optical communication coverage over a large range, which is larger than the achievable optical wireless communication range of a single optical transceiver. Advantageously, to reduce energy use, as the unmanned underwater vehicle moves, the most suitable modules can automatically be selected by the control module 11 for transmitting optical signals. The selection of the most suitable transmitters can be based on the measured signal strength measured by each module 3, and/or based on which modules 3 most recently received an optical signal (e.g. received an optical signal from the moving vehicle), and/or based on statistics, and/or based on packet loss. The control module 11 may be configured to select those modules 3 for transmission which have recently received an optical signal, and/or those modules 3 which have a transmission strength above a predefined threshold and/or those modules 3 which have the highest signal transmission strength.

According to a further aspect of the present invention there is provided a method of transmitting an optical signal using an optical communication assembly 2 of an unmanned underwater vehicle 1 according to any of the above described embodiments. The method comprises the steps of, providing a data signal, which comprises data to be transmitted, along the bus cable 5 (e.g. along the data line 8 of the bus cable 5), so that each of the optical communication modules 3 receive the same data to be transmitted; providing a clock signal (Clk), along said bus cable 5 (e.g. along the clock line 9 of the bus cable 5), which is simultaneously received by each of said optical communication modules 3, so that the optical transmitter 3*b* of each module 3 transmits said same data, in the form of an optical signal, at the same time in said different directions.

In a preferred embodiment each of the optical communication modules further comprise a memory, and the method comprises the steps of providing the same data signal along the bus cable, to all of the optical communication modules, wherein the data signal comprises data to be transmitted; storing the data provided in the data signal in a respective memory of each optical communication module;

receiving at a processor of each respective optical communication module a transmit command which has been sent along the bus cable by the control module, wherein said transmit command it received by all of the processors at the same time;

in response to receiving the transmit command initiating the optical transmitter of the optical communication module to transmit said data which is stored in the memory of that optical communication module;

providing a same clock signal (Clk) which clocks when optical transmitter of each module transmits said data, to the processors of all of the optical communication modules, so that the transmission of said data by the optical transmitters of all of the optical communication modules is synchronized.

In an embodiment of the method the step of providing a data signal comprises providing a data signal which comprises data for transmission and a designation of which of the plurality of optical communication modules 3 is to transmit said data. The method may further comprise the step of, processing at a processor 15 of each optical communication module 3 the data signal, to determine if the respective optical communication module 3 is designated to transmit said data, and, disabling the transmitter 3*b* of the respective optical communication module 3 if the respective optical communication module 3 is not designated in the data signal to transmit the data. The step of providing a clock signal may comprise providing a clock signal along said clock line 9 so that the optical transmitter 3*b* of optical communication modules 3 designated in said data signal transmits said same data, in the form of an optical signal, at the same time in said different directions.

The data transmitted by the modules 3 comprises feedback signals for navigation and/or image data such as video signals, preferably high definition video signals or better. Said video signals may be generated using a camera on the vehicle 1; for example the video signals may comprise images of an underwater structure which is being inspected, which are captured by a camera which is mounted on the vehicle 1; the vehicle 1 is driven to capture images of various different parts of the underwater structure.

In an embodiment of the method each optical communication module 3 can transmit data corresponding to data contained in an optical signal received at its optical receiver 3*a*, to the control module 11. For example, an optical signal received at an optical receiver 3*a* may comprise data in the form of command signals for controlling the navigation of the unmanned underwater vehicle 1, the optical communication module 3 can transmit the command signals via the data line 8 to the control module 11; the control module 11 will execute the commands thereby effecting navigation control of the vehicle.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An optical communication assembly suitable for use underwater, the assembly comprising, a plurality of optical communication modules, each module comprising at least one optical transmitter which can selectively transmit data in the form of an optical signal; wherein each module is configured to initiate the transmission of data in response to the module receiving a transmit command, and, wherein each module is configured to receive a same clock signal (Clk) which clocks when the module transmits said data, so that the optical transmission of the plurality of modules is synchronised;

a bus cable, which is connected to all of said optical communication modules, along which data can be sent, and along which the clock signal (Clk) can be sent;

a control module which is connected to the bus cable, and which is configured to selectively provide a data signal along the bus cable, which comprises data to be transmitted, so that each of the optical communication modules receive the same data to be transmitted;

and wherein the control module is further configured to selectively provide the transmit command along said bus cable, which is simultaneously received by each of said optical communication modules, and to provide the same clock signal (Clk) to said optical communication modules so that the optical transmitter of each module transmits said same data, in the form of an optical signal, at the same time.

2. An optical communication assembly according to claim 1 wherein each of the optical communication modules further comprise at least one optical receiver which can receive optical signals.

3. An optical communication assembly according to claim 1 wherein the plurality of optical communication modules occupy different positions and/or have different orientations, so that optical signals can be sent and received in different directions.

4. An optical communication assembly according to claim 1, wherein each of the optical communication modules further comprise a processor, and wherein the processor of each optical communication module is configured to process signals received from said control module.

5. An optical communication assembly according to claim 4 wherein each of the optical communication modules further comprise a memory; and wherein the control module is configured to provide a data signal along the bus cable, wherein the data signal comprises data for transmission; and wherein the control module provides the same data signal to all of the optical communication modules;

and wherein the processor of each respective optical communication module stores the data for transmission in said memory of the respective optical communication module;

and wherein the processor of each respective optical communication module is further configured initiate the optical transmitter of its respective optical communication module, to transmit said data which is stored in said memory, in response to the processor receiving a transmit command from the control module;

and wherein the control module is configured to provide the same clock signal (Clk) to all of the optical communication modules so that the transmission of said data by the optical transmitters of all of the optical communication modules is synchronized.

6. An optical communication assembly according to claim 1 wherein the bus cable comprises at least, a data line along which data can be sent, and a clock line along which a clock signal can be sent; or wherein the bus cable comprises a single line along which data can be sent and a clock signal can be sent.

7. An optical communication assembly according to claim 1, wherein the bus cable further comprises a power line along with power can be supplied to all of the optical communication modules.

8. An optical communication assembly according to claim 1, wherein each optical communication module can transmit data corresponding to optical data in an optical signal received at its optical receiver, to the control module, via the bus cable.

9. An optical communication assembly according to claim 1, wherein the optical communication assembly further comprises bus arbiter wherein each of the plurality of optical communication modules can send a request to the bus arbiter to be master of the bus cable so that the respective optical communication module can transmit data to the control module via the bus cable.

10. An optical communication assembly according to claim 4, wherein the control module which is connected to the bus cable is configured to selectively provide a data signal along the bus cable, wherein the data signal comprises data for transmission and a designation of which of the plurality of optical communication modules is to transmit said data;

wherein the processor of each respective optical communication module is configured to process data signal received from said control module, to determine if its module is designated to transmit said data, and the processor stores the data for transmission in said memory of the respective optical communication module only if the module is designated and wherein the processor of the optical communication modules are configured to initiate the optical transmitter to transmit said data which is stored in said memory, in response to the processor receiving a transmit command from the control module, so that only the optical transmitters of the designated optical communication modules are initiated to transmit said data;

and wherein the control module is configured to provide the same clock signal (Clk) to all of the optical communication modules so that the transmission of said data only by the optical transmitters of the designated optical communication modules, is synchronized.

11. An unmanned underwater vehicle comprising an optical communication assembly suitable for use underwater, the optical communication assembly comprising, a plurality of optical communication modules, each module comprising at least one optical receiver which can receive optical signals and at least one optical transmitter which can selectively transmit data in the form of an optical signal; wherein each module is configured to initiate the transmission of data in response to the module receiving a transmit command, and, wherein each module is configured to receive a same clock signal (Clk) which clocks when the module transmits said data, so that the optical transmission of the plurality of modules is synchronised); and wherein the plurality of optical communication modules are positioned on the unmanned underwater vehicle so that optical signals can be sent and received in different directions;

a bus cable, which is connected to all of said optical communication modules, along which data can be sent, and along which a clock signal can be sent;

a control module which is connected to the bus cable, and which is configured to selectively provide a data signal along the bus cable, which comprises data to be transmitted, so that each of the optical communication modules receive the same data to be transmitted;

and wherein the control module is further configured to selectively provide said transmit command along said bus cable which is simultaneously received by each of said optical communication modules, and wherein the control module is further configured to provide the same clock signal (Clk) to all of the optical communication modules, which clocks when the module transmits said data, so that the optical transmitter of each module transmits said same data, in the form of an optical signal, at the same time, in said different directions.

12. An unmanned underwater vehicle according to claim 11, wherein unmanned underwater vehicle comprises one or more optical communication modules located on one side of the vehicle and one or more optical communication module located on an opposite side of the vehicle, so that the optical communication assembly can send and/or receive optical signals at either side of the vehicle.

13. An unmanned underwater vehicle according to claim 11 comprising the optical communication assembly according to claim 1.

14. A method of transmitting an optical signal using an optical communication assembly according to claim 1, the method comprising the steps of, providing a data signal, which comprises data to be transmitted, along the data line, so that each of the optical communication modules receive the same data to be transmitted;

providing a clock signal, along said bus cable, which is simultaneously received by each of said optical communication modules, so that the optical transmitter of each module transmits said same data, in the form of an optical signal, at the same time in said different directions.

15. A method according to claim 14 comprises the steps of, providing the same data signal along the bus cable, to all of the optical communication modules, wherein the data signal comprises data to be transmitted;

storing the data provided in the data signal in a respective memory of each optical communication module;

receiving at a processor of each respective optical communication module a transmit command which has been sent along the bus cable by the control module, wherein said transmit command it received by all of the processors at the same time;

in response to receiving the transmit command initiating the optical transmitter of the optical communication module to transmit said data which is stored in the memory of that optical communication module;

providing a same clock signal (Clk) which clocks when optical transmitter of each module transmits said data, to the processors of all of the optical communication modules, so that the transmission of said data by the optical transmitters of all of the optical communication modules is synchronized.

16. A cable comprising an optical communication assembly according to claim 1, wherein said plurality of optical communication modules are distributed along a length of the cable.

* * * * *